(12) United States Patent
Gahan et al.

(10) Patent No.: US 6,802,315 B2
(45) Date of Patent: Oct. 12, 2004

(54) VAPOR DEPOSITION TREATED ELECTRET FILTER MEDIA

(75) Inventors: Richard E. Gahan, Wrentham, MA (US); Wai Ming Choi, West Newton, MA (US)

(73) Assignee: Hollingsorth & Vose Company, East Walpole, MA (US)

(*) Notice: Subject to any disclaimer, the term of this patent is extended or adjusted under 35 U.S.C. 154(b) by 332 days.

(21) Appl. No.: 09/813,548

(22) Filed: Mar. 21, 2001

(65) Prior Publication Data

US 2002/0174869 A1 Nov. 28, 2002

(51) Int. Cl.[7] .......................... A62B 23/02; A62B 7/10; B01D 24/00
(52) U.S. Cl. ........................ 128/206.12; 128/201.17; 128/201.29; 128/205.27; 128/205.29; 128/206.11; 128/206.18; 128/206.19; 55/524; 55/528; 55/DIG. 39; 96/69
(58) Field of Search ................ 128/201.17, 201.25, 128/205.27, 205.29, 206.11, 206.12, 206.13, 206.14, 206.15, 206.16, 206.17, 206.18, 206.19; 96/69; 55/524, 528, DIG. 39

(56) References Cited

U.S. PATENT DOCUMENTS

| | | | |
|---|---|---|---|
| 4,264,750 A | 4/1981 | Anand et al. | 525/356 |
| 4,404,256 A | 9/1983 | Anand et al. | 428/409 |
| 4,407,852 A * | 10/1983 | Sapieha et al. | 427/489 |
| 4,513,349 A | 4/1985 | Olson et al. | 361/311 |
| 4,515,931 A | 5/1985 | Olson et al. | 526/323.2 |
| 4,533,710 A | 8/1985 | Olson et al. | 526/323.2 |
| 4,647,818 A | 3/1987 | Ham | 315/111.21 |
| 4,696,719 A | 9/1987 | Bischoff | 202/205 |
| 4,842,893 A | 6/1989 | Yializis et al. | 427/44 |
| 4,954,371 A | 9/1990 | Yializis | 427/44 |
| 5,025,052 A * | 6/1991 | Crater et al. | 524/104 |
| 5,034,265 A | 7/1991 | Hoffman et al. | 428/253 |
| 5,090,985 A | 2/1992 | Soubeyrand et al. | 65/60.52 |
| 5,110,620 A | 5/1992 | Tani et al. | |

(List continued on next page.)

FOREIGN PATENT DOCUMENTS

| | | |
|---|---|---|
| GB | 1080649 | 8/1967 |
| JP | 06047218 | 2/1994 |
| JP | 07227510 | 8/1995 |
| WO | WO 00/78430 A2 * | 12/2000 |
| WO | WO 01/07144 A1 * | 2/2001 |

OTHER PUBLICATIONS

Freidrich, J.F., Barrier Properties of Plasma and Chemically Fluorinated Polypropylene and Polyethyleneterephthalate, 1995, Surface Coatings & Technology, vol. 74–75, pp 910–918.*

Benoist, P. et al., "Polyurethane Fluorination with a Cold Plasma Treatment," *Vide–Couches Minces*, No. 272, 398–401 (Aug.–Oct. 1994).

d'Agostino, R. et al., "Plasma Polymerization of Fluorocarbons," *Plasma Deposition, Treatment and Etching of Polymers*, 95–162 (1990).

Favia, P. et al., "Surface Chemical Composition and Fibrinogen Adsorption–Retention of Fluoropolymer Films Deposited from an RF Glow Discharge," *Plasmas and Polymers*, vol. 1, No. 4, 299–326 (1996).

(List continued on next page.)

*Primary Examiner*—Henry Bennett
*Assistant Examiner*—Mital Patel
(74) *Attorney, Agent, or Firm*—Nutter McClennen & Fish LLP

(57) ABSTRACT

A vapor phase treated electret filter media includes an additive or mixtures thereof that enhance the charge stability of the media. The filter media achieves acceptable alpha values for a range of filtration challenges without significant decay in alpha values over time. Preferred charge additives include fatty acid amides and mixtures thereof. Exemplary vapor phase deposition monomers include fluorinated monomers.

62 Claims, 2 Drawing Sheets

U.S. PATENT DOCUMENTS

| | | | | |
|---|---|---|---|---|
| 5,364,665 | A | | 11/1994 | Felts et al. ................. 427/571 |
| 5,401,446 | A | | 3/1995 | Tsai et al. ..................... 264/22 |
| 5,411,576 | A | * | 5/1995 | Jones et al. ..................... 95/57 |
| 5,472,481 | A | * | 12/1995 | Jones et al. ..................... 96/15 |
| 5,645,627 | A | * | 7/1997 | Lifshutz et al. ................ 96/15 |
| 5,647,913 | A | | 7/1997 | Blalock ...................... 118/723 |
| 5,726,107 | A | * | 3/1998 | Dahringer et al. ........... 442/414 |
| 5,935,303 | A | * | 8/1999 | Kimura .......................... 96/69 |
| 5,964,926 | A | | 10/1999 | Cohen |
| 5,968,635 | A | * | 10/1999 | Rousseau et al. ............ 428/198 |
| 5,976,208 | A | * | 11/1999 | Rousseau et al. ........... 55/385.3 |
| 6,002,017 | A | * | 12/1999 | Rousseau et al. ............ 548/451 |
| 6,214,094 | B1 | * | 4/2001 | Rousseau et al. .............. 96/15 |
| 6,238,466 | B1 | * | 5/2001 | Rousseau et al. .............. 96/15 |
| 6,268,495 | B1 | * | 7/2001 | Rousseau et al. ........... 544/197 |
| 6,288,157 | B1 | * | 9/2001 | Jariwala et al. ............. 524/462 |
| 6,397,458 | B1 | | 6/2002 | Jones et al. |
| 6,398,847 | B1 | | 6/2002 | Jones et al. |
| 6,409,806 | B1 | | 6/2002 | Jones et al. |
| 6,419,871 | B1 | * | 7/2002 | Ogale .......................... 264/423 |
| 6,524,360 | B2 | * | 2/2003 | Cox et al. ...................... 55/382 |
| 2001/0039879 | A1 | * | 11/2001 | Chapman ....................... 96/69 |

OTHER PUBLICATIONS

Fifoot, R.E., "Fluoroplastics," Modern Plastics Mid–October Encyclopedia Issue, pp. 25–26.

Friedrich, J.F. et al., "Barrier Properties of Plasma and Chemically Fluorinated Polypropylene and Polyethyleneterephthalate," *Surface and Coatings Technology*, vol. 74–75, 910–18 (1995).

Golub, M.A. et al., "On the Similarity of Plasma–polymerized Tetrafluoroethylene and RF Plasma–sputtered Polytetrafluoroethylene," *Abstracts of Papers of the American Chemical Society*, vol. 214, No. 2, 668–9 (Sep. 7, 1997).

Klausner, M. et al., "Surface Modification of Polymers with Fluorine Containing Plasmas: Deposition vs. Replacement Reactions," *Poly. Mater. Sci. & Eng.*, vol. 56, 227–31 (1987).

Labelle, C.B. and Gleason, K.K., "Pulsed Plasma Enhanced Chemical Vapor Deposition from C2H2F4, CH2F2, and CHCLF2," *Polymer Preprints*, vol. 39, No. 2, 928–9 (Aug. 1998).

Lau, K.K.S. and Gleason, K.K., "High Resolution $^{19}$F MAS NMR Spectroscopy of Pulsed Plasma–Polymerized Fluorocarbon Films," *Polymer Preprints*, vol. 39, No. 2, 936–7 (Aug. 1998).

Loh, I.H., "Surface Modifications of Polymers with Fluorine–Containing Plasmas: Deposition Versus Replacement Reactions," *Polymer Engineering and Science*, vol. 27, No. 11, 861–8 (Jun., 1987).

Luginbuehl, R. et al., "Surface Chemistry and Elastic Properties of Plasma Deposited Fluoropolymers," *Polymer Preprints*, vol. 39, No. 2, 932–3 (Aug. 1998).

"Innovative Turnkey Coating and Surface Treatment Systems," Sigma Technologies Intl. Inc. Bulletin 3000.

Silverstein, M.S. and Chen, R., "Effect of Monomer Composition on the Structure and Properties of Plasma Fluoropolymers," *Polymer Preprints*, vol. 38, No. 1, 1025–6 (Apr. 1997).

Vargo, T.G. and Koloski, T.S., "Highly Adherent Metallization via Direct Covalent Bonding of Transition Metals to Plasma Modified Fluoropolymers," *Proc. Annu. Meet. Adhes. Soc.*, vol. 22, 86–7 (1999).

Yeh, Y.S. et al., "Blood Compatibility of Surfaces Modified by Plasma Polymerization," *Journal of Biomedical Materials Research*, vol. 22, 795–818 (1988).

\* cited by examiner

VAPOR DEPOSITION TREATED ELECTRET FILTER MEDIA

BACKGROUND OF THE INVENTION

This invention relates to electret filter media having enhanced charge stability.

Electret filter media have long been used in many filtration applications. Electret filter media are those that include a dielectric insulating polymer web that is treated to possess substantially permanent spatially oriented, opposite charge pairs or dipoles. Among the common polymer webs used for electret filter media are polypropylene, polyethylene, polyester, polyamide, polyvinyl chloride, and polymethyl methacrylate.

Conventional filter media are substantially lacking in electrostatic charge and rely upon impingement, impaction and diffusion for filter performance. Electret filter materials offer improved filtering performance over conventional filter materials. The presence of oriented dipoles in the electret filter media is believed to enhance filter performance by allowing the filter media to attract and retain charged and uncharged particles to be filtered.

Electret filter materials are made using a variety of known techniques. One technique for manufacturing electret filter media involves extruding a polymer, typically having a high melt flow index, through a die having a linear array of orifices. An air knife is used to attenuate the extruded polymer fibers by a ratio of about 300:1. The attenuated fibers, having diameters of about one to ten micrometers, are collected on a rotating drum or moving belt using a moderate vacuum. The fiber web is then treated to impart on the fiber web charge pairs or dipoles. The charge pairs or dipoles can be imparted to the fiber, for example, using AC and/or DC corona discharge.

One problem associated with electret filter material is that the charge pairs or dipoles imparted to the filter media often are not stable. In some instances, charge or its spatial orientation, is lost after filtering certain contaminants for relatively short time periods. The result is a marked decrease in filter performance over a relatively short period of time (e.g., less than 20 minutes). The National Institute of Safety and Health (NIOSH) has established standards for performance of certain filters. The NIOSH standards evaluate filters in a carrier after a 200 milligram filtration challenge. One challenge of solid aerosol particles evaluates filter performance against solid sodium chloride particles suspended in air. Another challenge of liquid aerosol particles evaluates filter performance against liquid droplets of dioctyl phthalate (DOP) suspended in air. Electret filter media generally are able to maintain charge stability and filter performance when filtering solid aerosols, including the sodium chloride test standard. However, liquid aerosols tend to degrade the charge on the electret filter media, and thus filter performance diminishes after only a short period of filtration.

Accordingly, there is a need for electret filter media having improved charge stability and that are able to maintain acceptable filter performance over time.

SUMMARY OF THE INVENTION

The present invention circumvents the problems described above by providing an electret filter media that retains particles and/or oil without significant reduction in filtration performance, even after prolonged filtration challenges. In general, the present invention is directed to a charge stabilized electret filter media that provides enhanced filtration performance characteristics. The invention provides filter media that comprises a hydrophobic and/or oleophobic vapor phase deposition treated electret polymer meltblown fiber web.

In one embodiment, a filter media is provided having formed thereon a polymeric coating that is created through a vapor phase deposition process. In another aspect, the invention relates to a method for manufacturing a filter media that comprises a meltblown hydrophobic and/or oleophobic vapor phase deposition treated electret polymer media.

The invention provides filter media having a meltblown hydrophobic and/or oleophobic vapor phase deposition treated electret polymer fiber web. Optionally, the meltblown web is deposited on a spunbond layer. The polymer web of meltblown polymer fibers is coated with a hydrophobic and/or oleophobic monomer by a vapor phase deposition process. The hydrophobic and/or oleophobic monomer is a suitable fluorine-containing monomer. Following deposition, the monomer is polymerized, such as by contact with a sufficient quantity of a suitable source of energy. The web is then treated to form substantially permanent charge pairs or dipoles therein. Permanent dipoles, e.g., electret characteristics, can be imparted to the web by a variety of techniques including AC corona or DC corona discharge and combinations thereof. In one embodiment, the manufacturing process can be modified by heat treating, e.g., annealing, the polymer web prior to vapor phase deposition.

In one embodiment it is possible to clean or prepare the surface of the meltblown web, prior to the vapor deposition step, by a technique such as plasma treatment, heat treatment, or flame treatment of the web.

The hydrophobic and/or oleophobic monomer useful for the vapor deposition process can be a hydrophobic and/or oleophobic material such as an alkylene, acrylate, methacrylate, alkyl oxirane, or alkylene oxirane. Preferably the monomer is halogenated, and most preferably it is fluorinated.

In one embodiment, the web may be a meltblown web that includes a charge stabilizing additive, such as a melt processable fatty acid amide. Typically, the charge stabilizing additive is present at a concentration in the range of about 0.01% to 20% by weight.

Although the fiber web is sometimes referred to herein as a meltblown web, it is understood that a variety of polymer and glass fiber webs may be used in accordance with the present invention. Suitable types of polymer webs include carding webs, spunbond webs, and spun laced webs.

The filter media of the invention may be used in a variety of filtration applications, including use in industrial face masks or respirators, indoor air quality filters, surgical masks, room air cleaners, cabin air filters, vacuum filters, HVAC filters, HEPA filters ASHRAE filters and ULPA filters. It is understood that the term "filter" as used herein encompasses any device with which filter media of the invention may be used to filter air and/or other gases.

The electret filter media of this invention is characterized by improved filtration performance and enhanced charge stability of the electret polymer web. In particular, the filter media is able to provide desirable filtration properties, as indicated by alpha value, despite continued filtration challenge. In one embodiment, the filter media meets the NIOSH standard for class P 95 nonwoven filter media. In another embodiment, the filter media meets the NIOSH standard for class P 99 nonwoven filter media. Preferably, the filter media meets the NIOSH standard for class P 100 nonwoven filter media.

Other advantages of the invention will be readily apparent to one having ordinary skill in the art upon reading the following description.

All percentages by weight identified herein are based on the total weight of the web unless otherwise indicated.

BRIEF DESCRIPTION OF THE DRAWINGS

Other objects, advantages and features of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

The present invention is based, at least in part, on the discovery of an electret filter media with improved charge stability. The charge stability is manifested by acceptable alpha levels, with minimal alpha decay, when the filter media are subjected to solid and/or liquid aerosol challenges. In instances where alpha decay occurs, the final alpha value is still indicative of acceptable filter performance.

Figure 1:
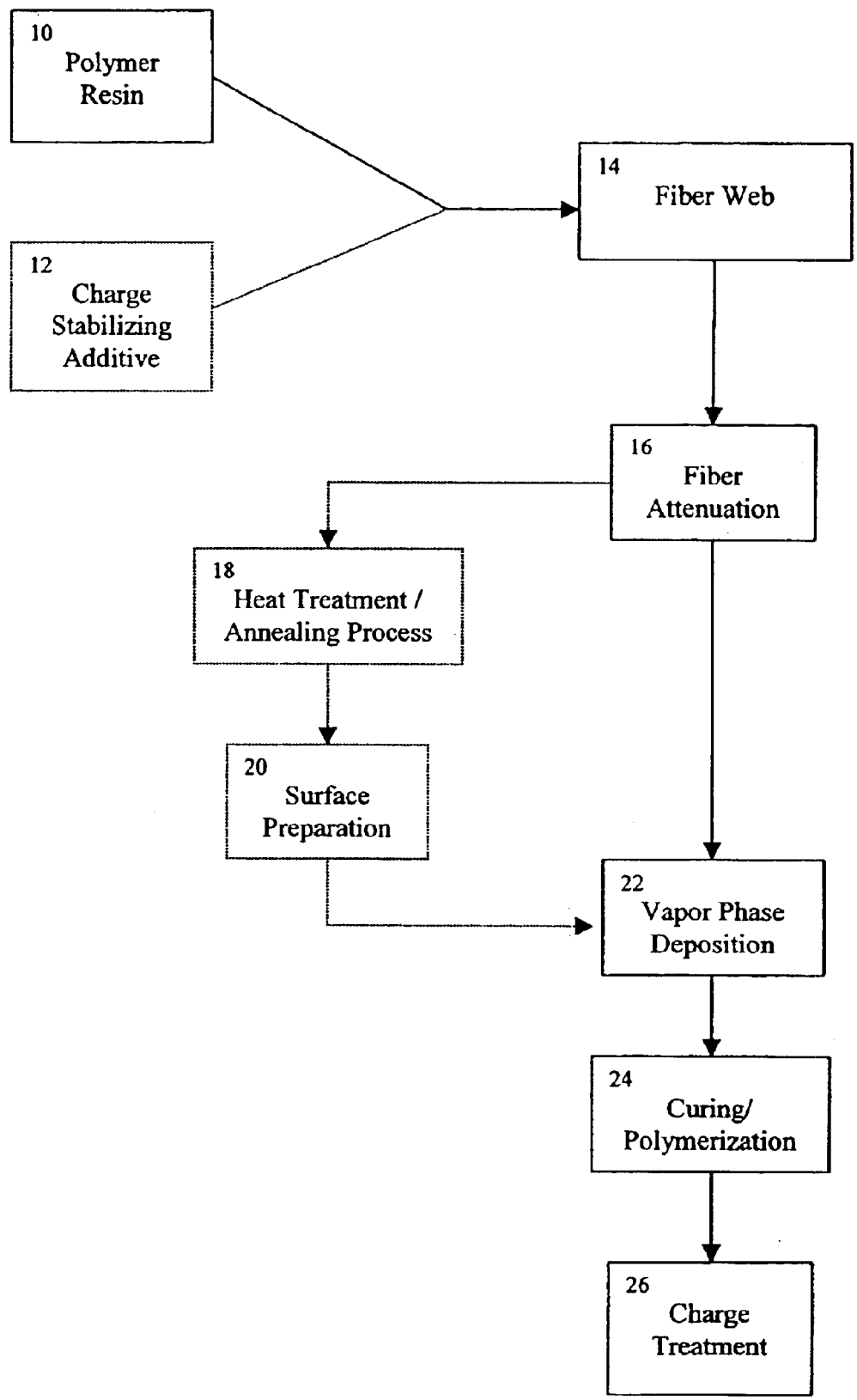
FIG. 1 is a flow chart illustrating a process for manufacturing vapor phase deposition treated electret filter media according to the invention.

In general, the filter media of the invention include a hydrophobic and/or oleophobic vapor phase deposition treated electret polymer fiber web that optionally can include at least one charge stabilizing additive, e.g., a fatty acid amide, or mixtures of two or more fatty acid amides. FIG. 1 illustrates the general process for manufacturing the electret filter media according to the invention. A meltblown fiber web can be prepared by processing a polymer fiber web from a polymer resin 10 according to known techniques. Optionally, a charge stabilizing additive 12 may be incorporated into the meltblown product during the melt blowing process 14. The fiber web can be attenuated 20, and then optionally subjected to a heat treatment or annealing process. As a further option, the surface of the meltblown polymer fiber web can be cleaned and/or prepared 20 prior to vapor deposition. The meltblown fiber web is then coated with a hydrophobic and/or oleophobic monomer through a vapor phase deposition process 22. The web is then exposed to a suitable energy source 24 to polymerize the monomer and thereby form a polymeric coating on the web. Charge 26 is then imparted on the web to form substantially permanent charge pairs of dipoles.

The electret filter media of the invention can be formed of more than one layer of meltblown fiber web, depending upon the requirements of a given filtration application. In one embodiment the meltblown web is deposited on a spunbond layer, which typically improves the ability to handle the meltblown web during and after processing. Although the fiber web is sometimes referred to herein as a meltblown web, it is understood that a variety of polymer and glass fiber webs may be used in accordance with the present invention. Suitable types of polymer webs include carding webs, spun bond webs, and spun laced webs.

A variety of polymeric materials can be processed to form the meltblown fiber web. These include polyolefins such as polyethylene, polypropylene, polyisobutylene, and ethylene-alpha-olefin copolymers; acrylic polymers and copolymers such as polyacrylate, polymethylmethacrylate, polyethylacrylate; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyamides such as Nylon 66 and polycaprolactam; polyesters, such as polyethylene terephthalate; polycarbonates; polyimides; polyethers; fluoropolymers such as polytetrafluoroethylene and fluorinated ethylenepropylene. Polypropylene is among the more preferred polymeric materials.

In the case of meltblown and glass fiber webs, the fiber web can have a relatively broad distribution of fiber diameters. The average fiber diameter of the polymer used to form the polymer fiber web is generally in the range of about 0.5 to about 20 micrometers. Depending on the intended application, a more preferred average polymer fiber diameter is in the range of about 1 to 15 micrometers, more preferably about 2 to 4 micrometers.

The web basis weight of the meltblown fiber web will vary depending upon the requirements of a given filtering application. In general, higher web basis weights yield better filtration, but there exists a higher resistance, or pressure drop, across the filter barrier when the filter media has a higher basis weight. For most applications the web basis weight can be in the range of about 10 to 520 g/m$^2$. Preferably the web weight is in the range of about 30 to 400 g/m$^2$, more preferably about 30 to 200 g/m$^2$. One of ordinary skill in the art can readily determine the optimal web basis weight, considering such factors as the desired filter efficiency and permissible levels of resistance. Furthermore, the number of plies of the meltblown fiber web used in any given filter application can also vary from approximately 1 to 10 plies. The resistance of each layer can be slightly higher or lower so as to form a gradient density web. One of ordinary skill in the art can readily determine the optimal number of plies to be used.

As noted above, the meltblown fiber web can optionally have incorporated therein a desired amount of a charge stabilizing additive, e.g., a fatty acid amide. The charge stabilizing additive can be present within the meltblown fiber web at a concentration in the range of about 0.01 to 20% by weight. In other embodiments, the charge stabilizing additive can be present within the polymer fiber web at a concentration in the range of about 2.0% to 20% by weight. A preferred concentration range for the charge stabilizing additive is in the range of about 5% to 11% by weight of the web, and most preferably about 1% and 8%. The ranges of concentrations intermediate to those listed are also intended to be part of this invention, e.g., about 2.5% to 17%, about 4.0% to 15%, and about 6.0% to 12.0% by weight. For example, ranges of concentration using a combination of any of the above values recited as upper and/or lower limits are intended to be included, e.g., about 1% to 6%, about 2.5 to 12%, etc.

Examples of suitable charge stabilizing additives include fatty acid amides derived from fatty acids. The term "fatty acid" is recognized by those having ordinary skill in the art and it is intended to include those saturated or unsaturated straight chain or branched chain carboxylic acids obtained from the hydrolysis of fats. Examples of suitable fatty acids include lauric acid (dodecanoic acid), myristic acid (tetradecanoic acid), palmitic acid (hexadecanoic acid), stearic acid (octadecanoic acid), oleic acid ((Z)-9-octadecenoic acid), linoleic acid ((Z,Z)-9,12-octadecadienoic acid), linolenic acid ((Z,Z,Z)-9,12,15-octadecatrienoic acid) and eleostearic acid (Z,E,E)-9,11,13-octadecatrienoic acid). Typically the amides formed from the above referenced acids are primary amides which are prepared by methods well known in the art.

Examples of preferred fatty acid amides include stearamide and ethylene bis-stearamide. An exemplary stearamide is commercially available as UNIWAX 1750, available from UniChema Chemicals, Inc. of Chicago, Ill. ACRAWAX® C is an ethylene bis-stearamide which is commercially available from Lonza, Inc. of Fair Lawn, N.J. ACRAWAX® C contains N,N'-ethylenebisstearamide (CAS No. 110-30-5) and N,N'-ethylenebispalmitamide (CAS No. 5518-18-3) with a mixture of C-14 to C-18 fatty acid derivatives (CAS No. 67701-02-4) with an approximate ratio of 65/35/2 (N,N'-ethylenebisstearamide/N,N'-ethylenebispalmitamide/mixture of C-14 to C-18 fatty acid derivatives) by weight. For example, the commercial product includes N,N'-ethylenebisstearamide, N,N'-ethylenebispalmitamide with C14–C18 fatty acids. In certain embodiments of the invention, either N,N'-ethylenebisstearamide or N,N'-ethylenebispalmitamide can be the sole charge stabilizing additive. In another embodiment, the ratio of a C14–C18 fatty acid can be varied from between about 0 to 20% based on the total amount of the bisamides. In still other embodiments, mixtures of N,N'-ethylenebisstearamide and N,N'-ethylenebispalmitamide which fall in the range between about 0 to 100% for each bisamide can be utilized as additive mixtures, e.g., 80/20, 70/30, 5/50, etc.

Secondary and tertiary fatty acid amides are also suitable as charge stabilizing agents where the amide nitrogen is substituted with one or more alkyl groups. Secondary and tertiary fatty acid amides can be prepared by methods well known in the art, such as by esterification of a fatty acid followed by an amidation reaction with a suitable alkylamine. The alkyl substituents on the amide nitrogen can be straight chain or branched chain alkyl groups and can have between about two and twenty carbon atoms, preferably between about two and fourteen carbon atoms, more preferably between about two and six carbon atoms, most preferably about two carbon atoms. In a preferred embodiment, the fatty acid amide can be a "bis" amide wherein an alkyl chain tethers two nitrogens of two independent amide molecules. For example, alkylene bis-fatty acid amides include alkylene bis-stearamides, alkylene bis-palmitamides, alkylene bis-myristamides and alkylene bis-lauramides. Typically the alkyl chain tether includes between about two and eight carbon atoms, preferably two carbon atoms. The alkyl chain tether can be branched or unbranched. Preferred bis fatty acid amides include ethylene bis-stearamides and ethylene bis-palmitamides such as N,N'-ethylenebisstearamide and N,N'-ethylenebispalmitamide.

As shown in FIG. 1, after the meltblown fiber web is processed 16 from the polymer resin 12 and, optionally, the charge stabilizing additive 14, the web can be attenuated 20, for example, by drawing the fibers at a ratio of about 300:1.

Following any fiber attenuation, the meltblown fiber web can be subjected to a process 18 that cleans and/or prepares the surface(s) of the meltblown fiber web for vapor deposition. This treatment can be conducted via plasma, heat, or flame treatment. The etching or cleaning process is typically done using oxygen as the process gas (i.e., a cold burning process) which transforms any surface contamination or substrate surface into typical combustion products like $H_2O$, $CO_2$, $NO_x$, etc. In one embodiment, plasma treatment 18 is useful for etching or cleaning the substrate surface prior to subjecting the surface to vapor phase deposition. Any plasma treatment apparatus known in the art can be used, such as, for example, the plasma treatment apparatus disclosed in U.S. Pat. No. 5,364,665 (Felts et al.).

Surface preparation may take place at ambient temperatures, or temperatures in the range of about 65° C. to 230° C., preferably about 50° C. to 120° C. More preferably, the temperature of the treatment is in the range of about 60° C. to 90° C. for approximately about 1/10 seconds to 5 seconds and most preferably for about 1 to 2 seconds. One of ordinary skill in the art will recognize that the actual plasma temperature is dependent on the gas used.

Once the meltblown fiber web has been properly prepared, the web is subjected to a vapor phase deposition process. Through this process, the vaporized monomer is condensed, forming a liquid coating over the surface of the meltblown fiber web. The liquid monomer is subsequently polymerized or cured upon the web. Polymerization can be initiated by exposing the monomer-coated web to a suitable energy source, as discussed below.

Various methods are known to those skilled in the art which are suitable for vapor phase deposition. Suitable methods include, but are not limited to, those techniques disclosed in U.S. Pat. Nos. 4,842,893; 4,954,371; and 5,090,985, all of which teach general methods for vapor phase generation. The contents of these references are incorporated herein by reference.

Figure 2:
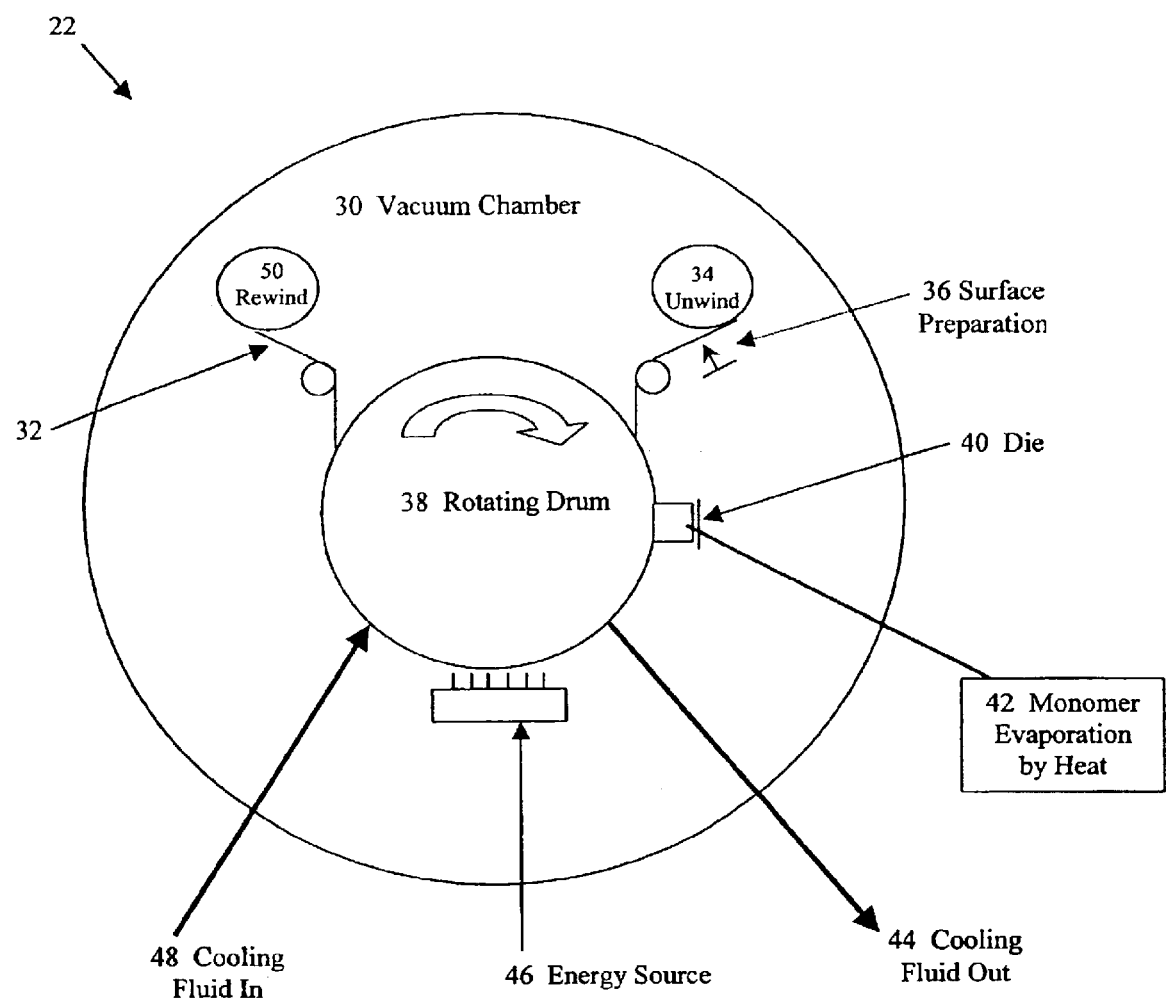
FIG. 2 is a diagram illustrating the vapor phase deposition step of FIG. 1.

FIG. 2 illustrates a vapor phase deposition process 22 according to the present invention in which a continuous polymer coating is applied to the fiber web by processing the fiber web on a rotating drum 38 contained in a vacuum chamber 30 that is maintained at sub-atmospheric pressure. An untreated supply of fiber web is maintained on unwind roll 34, and from the unwind roll 34 it is passed onto a rotating drum 38 which guides the fiber web 32 to various processing stations. Finally, the treated web is collected on rewind roll 50.

During the vapor phase deposition process, a suitable oleophobic and/or hydrophobic monomer is evaporated in chamber 42 and introduced into the vacuum chamber 30 through a slot die 40 where it is exposed to web 32. The fiber web 32 is advanced on the rotating drum 38, which is maintained at a temperature that is sufficient to cause the vapor phase monomer to condense onto the surface(s) of the web. The surface of the drum 38 can be maintained at a temperature below the boiling point of the vaporized monomer by, for example, circulating cooling fluids into and out of 48, 44 the drum. As a result of this temperature differential, the monomer vapor condenses onto the surface(s) of the meltblown fiber web thereby coating the web with liquid monomer. This process can be carried out on one or both surfaces of the meltblown fiber web.

Continued rotation of drum 38 will expose the monomer-coated web to energy source 46, which cures or polymerizes the monomer, yielding a fiber web having a polymeric coating disposed on one or both surfaces thereof. Finally, the polymer coated web is collected on rewind roll 50.

One of ordinary skill in the art will appreciate that various processing parameters can be used depending on factors including the type of the fiber web and the monomer used.

In one embodiment the rotating drum 38 is cooled to a temperature specific to the particular monomer being used and generally in the range of 20° C. to 80° C. to facilitate condensation of the vaporized monomer. The drum rotates at speeds in the range of about 1 to 1000 cm/second causing the polymeric web to be fed through the vapor phase deposition treatment chamber at a speed in the range of about 10 fpm (feet per minute) to 1300 fpm, preferably at about 25 fpm to 750 fpm and most preferably at about 100 fpm to 300 fpm. These parameters may vary widely as the dimensions of the apparatus change to accommodate, for example, a higher throughput. As web width increases, pressures, flow rates of reactive gas(es), and power levels will have to be scaled up accordingly. A preferred speed utilized to produce meltblown fiber webs of the invention is one which provides less than about 0.1 second of residence time in the reaction.

The vacuum chamber 30 is evacuated to a stable base pressure, generally around about 0.01 Torr through about 760 Torr (atmospheric pressure), preferably between about 0.05 to about 0.15 Torr, depending on the composition of the untreated web material. Operating pressure is generally maintained between about 0.01 and 10.0 Torr and more preferably between about 0.01 and 1.0 Torr using a vacuum pump.

As noted above, the monomer is vaporized and then conveyed into the vacuum chamber 30, where it condenses onto the fiber web 32. The gas flow rate into the vacuum chamber is maintained at a rate in the range of about 1 to 100 lpm (liters per minute) and more preferably at about 0.1 to 10 lpm. Alternatively, gas flow can be measured in lpm per foot width of web material. Suitable gas flow rates using this parameter is in the range of about 1 to 20 lpm per foot width, more preferably at about 2 to 20 lpm per foot width, and most preferably at about 3 lpm per foot width.

When subjecting the meltblown fiber web to vapor phase deposition 22, it is not necessary in all applications that the vapor be deposited in a uniform manner. In general, a coating layer as thin as 50 angstroms may be sufficient for certain applications. However, to obtain a uniform layer, generally the layer has a thickness of at least about 500 angstroms and will range up to about 1 micron in thickness. The exact thickness of the applied layer will vary with the size and composition of the meltblown fiber web being treated, the composition of the layer being applied, and the extent to which the meltblown fiber web is exposed to the concentration of vapor that is condensed onto the surface of the meltblown fiber web. Moreover, it is desirable to minimize the coating thickness so as to not substantially increase the pressure drop across the filter media. The feed rate of the fiber web as well as the temperature of vaporization help to control the amount of monomer that is coated/condensed onto the meltblown fiber web. The thickness of the monomer coating, measured in the Z-direction, can be controlled as well by the conditions chosen by the operator. The coating typically has a thickness in the range of about 100 to 1500 Angstroms, preferably from about 100 to 500 Angstroms, and most preferably from about 200 to 300 Angstroms.

The monomer applied to the meltblown fiber web is preferably one which is hydrophobic and/or oleophobic and which vaporizes at temperatures around or above 150° C. Preferably the monomer is an alkylene, an acrylate, or a methacrylate species. Most preferably, the monomer is halogenated, e.g., fluorinated. Generally the choice of monomer(s) is only limited by the ability of the monomer to be vaporized to a gaseous form. However, to prevent coating of the inside chamber, only monomers having relatively low vapor pressures are used. This ensures quick liquid formation on the substrate after contact with the fiber web surface.

Exemplary monomers are those that contain at least one degree of unsaturation, e.g., vinyl or allyl group, e.g., alkylenes, or those monomers which contain an oxirane ring (epoxides), oxetanes, or ether rings, e.g., alkyl oxiranes or alkylene oxiranes. Therefore, acryl, methacryl, unsaturated amides, di, tri, tetra acrylates, methacrylates, dienes, trienes, oxiranes, alkylene oxiranes, and oxetanes in monomeric or oligomeric form can be used for hydrophobic and/or oleophobic vapor phase deposition polymerization upon the fiber web.

A further exemplary hydrophobic and/or oleophobic alkylene is hexafluoropropylene. An exemplary hydrophobic and/or oleophobic alkyl oxirane is hexafluoropropyl oxirane (2-trifluoromethyl-2-fluoro-3,3-difluorooxirane). An exemplary hydrophobic and/or oleophobic acrylate is 2,2,3,3,4,4,4-heptafluorobutyl acrylate or 2,2,3,4,4,4-hexafluorobutyl acrylate, and an exemplary methacrylate is 2,2,3,4,4,4-hexafluorobutyl methacrylate or 2,2,3,3,4,4,4-heptafluorobutyl methacrylate.

Additional exemplary monomers include unsaturated fluorocarbons such as tetrafluoroethylene, hexafluoropropylene and octafluorobutylene; and organosilicones such as hexamethyldisiloxane, tetramethyldisiloxane and tetraethoxysilane. Mixtures of the aforementioned monomers with gases, such as helium and hexafluoropropylene, are also contemplated. Of course, the choice of gas is virtually limitless so long as it is possible to vaporize the monomer to form vapor phase deposition reactive species.

Particularly preferred monomers include those that are halogenated and provide hydrophobicity and/or oleophobicity to the treated fiber web. Suitable examples of hydrophobic and/or oleophobic vinyl groups include tetrafluoroethylene, octafluorobutylene and preferably hexafluoropropylene. Examples of hydrophobic and/or oleophobic halogenated alkyl oxiranes such as tetrahaloethyleneoxide, i.e., tetrafluoroethylene oxide (2,2,3,3-tetrafluorooxirane), hexahalopropylene oxide, i.e., hexafluoropropylene oxide (2-trifluoromethyl-2-fluoro-3,3-difluorooxirane), hexahalooxetanes, i.e., 2,2,3,3,4,4-hexafluorooxetane, and octahalobutylene oxide, i.e., octafluorobutylene oxide (2,2,3,3,4,4,5,5-octafluorotetrahydropyran). Examples of hydrophobic and/or oleophobic alkylene oxiranes include hexafluoroallyloxide.

The monomer can also include a photoinitiator to ensure polymerization and/or crosslinking of the monomer during the step 24. Photoinitiators are particularly useful where the energy source applied is an ultra violet light source. Typical photoinitiators include benzoin ethers, benzil ketal, acetophenones, chlorinated acetophenone derivatives, phosphine oxide, camphorquinone, aryldiazonium salts, and phenyphoophonium benzophenone salts. Commercial grades of these photo initiaters can be obtained from Ciba-Geigy. Photoinitiators may be present with the liquid monomer at a concentration in the range of about 0.05% to 5.0% by weight.

As noted above, once the fiber web has been vapor phase deposition treated 22, the condensed liquid monomer and fiber web are then exposed to sufficient energy 46 to facilitate polymerization 24 of the monomer. The energy source 46 initiates a free radical polymerization of the monomer causing the reactive monomer species to polymerize and/or crosslink. The resulting polymer coating formed on the fiber web is substantially uniform in thickness.

Suitable energy sources include apparatuses that emit infrared, electron beam (e-beam), thermionic, plasma, gamma, or ultraviolet radiation. Suitable ultraviolet light can include mercury, halogen, or fusion bulbs. The typical wavelength ranges for such energy sources is in the range of about 160 nm to 450 nm. The amount of energy expended by the curing source is measured in terms of watts. The amount of energy typically used for an e-beam source can be in the range of about 10 W to 10 W. The amount of energy for ultraviolet light is usually in the range from about 100 watts/inch to 600 watts/inch. The amount of energy can, however, be adjusted according to the line speed of operation.

Following the formation of the polymer coating on the web, the vapor phase treated fiber web is subjected to one or more charge treatment(s) 26 to form substantially permanent charge pairs or dipoles in the web.

A meltblown polymer web can be prepared as disclosed in WO 00/78430, entitled "Charge Stabilized Electret Filter Media," by Stephen T. Cox, filed on Jun. 17, 1999, the contents of which are incorporated herein by reference. A variety of techniques are well known to impart a permanent dipole to the polymer web in order to form electret filter media. Charging can be effected through the use of AC or DC corona discharge units and combinations thereof. The particular characteristics of the discharge are determined by the shape of the electrodes, the polarity, the size of the gap, and the gas or gas mixture. Another example of a process for producing electret properties in fiber webs can be found in U.S. Pat. No. 5,401,446, the contents of which are incorporated herein by reference.

Charging can be accomplished solely through the use of an AC corona discharge unit. In another embodiment it is useful to use both AC and DC corona discharge units. In a preferred technique the polymer web is first subjected to AC corona discharge followed by one or more successive treatments by a DC corona discharge unit. Charging can also be accomplished using other techniques, including friction-based charging techniques. Typically the fiber web is subjected to a discharge of between about 1 to about 30 kV(energy type, e.g., DC discharge or AC discharge)/cm, preferably between about 10 kV/cm and about 30 kV/cm, with a preferred range of between about 10 to about 20 kV/cm.

It will be appreciated by one of ordinary skill in the art that corona unit(s), AC corona discharge unit(s) and/or DC corona discharge unit(s) can be placed above and/or below a meltblown fiber web to impart electret properties to the fiber web. Configurations include placement of a neutrally grounded roll(s) on either side of the fiber web and the active electrode(s) above or below either side of the web. In certain embodiments, only one type of corona discharge unit, e.g., a DC or an AC corona discharge unit, is placed above, below or in an alternating arrangement above and below the fiber web. In other embodiments alternating AC or DC corona discharge units can be used in combination. The AC or DC corona discharge unit can be controlled so that only positive or negative ions are generated.

After the charging process 26, the resultant nonwoven fiber filter media has excellent filtration efficiency. The alpha decay is low and therefore, the decay on filtration efficiency is low.

The following examples serve to further described the invention.

EXAMPLE 1

A nonwoven web comprised of a 30 g/m$^2$ polypropylene meltblown containing 1% by weight of Acrawax C and a 0.45 oz/yd$^2$ polypropylene spunbond (H & V grade PE13030NQ, available from Hollingsworth & Vose Company, East Walpole, Mass.) was processed on a cold vapor deposition coater under vacuum at a pressure of 0.1 Torr. The unit and web width was 19 inches. The nonwoven web was first passed under a plasma unit operating with argon and at 50 watts of power. A fluoroacrylate monomer was vaporized and condensed onto the web at a feed rate of 16 ml/min. The web was processed at 150 fpm, depositing approximately 1 g/m$^2$ of fluoroacrylate on the web. The coated web was then passed through an electron-beam curing station at 10 kV and 20 mAmps. The treated web was then made into an electret by passing the web under two Simco charge bars at −20 kV and 1 mAmp. The height of the charge bar was approximately 1.5 inches.

Comparative Example A

A nonwoven web comprised of a 30 g/m$^2$ polypropylene meltblown containing 1% by weight of Acrawax C and a 0.45 oz/yd$^2$ polypropylene spunbond (H & V grade PE13030NQ, available from Hollingsworth & Vose Company, East Walpole, Mass.) was processed on a cold vapor deposition coater under vacuum at a pressure of 0.1 Torr. The unit and web width was 19 inches. The nonwoven web was first passed under a plasma unit operating with argon and at 50 watts of power. A fluoroacrylate was vaporized and condensed onto the web at a feed rate of 16 ml/min. The web was processed at 150 fpm, depositing approximately 1 g/m$^2$ of fluoroacrylate on the web. The coated web was then passed through an electron-beam curing station at 10 kV and 20 mAmps.

Comparative Example B

A nonwoven web comprised of a 30 g/m$^2$ polypropylene meltblown containing 1% by weight of Acrawax C and a 0.45 oz/yd$^2$ polypropylene spunbond (H & V grade PE13030NQ, available from Hollingsworth & Vose Company, East Walpole, Mass.). The web was made into an electret by passing the web under two Simco charge bars at −20 kV and 1 mAmp. The height of the charge bar was approximately 1.5 inches.

The materials produced by Example 1, Comparative Example A, and Comparative Example B were evaluated using a DOP loading test. The DOP test challenge is based on NIOSH standards as codified in 42 C.F.R. § 84 for filter classes where the three levels of filter efficiency are 95%, 99% and 99.97%. Categories for resistance to filter efficiency degradation are N (not resistant to oil, e.g., DOP), R (resistant to oil) and P (oil proof). The DOP test challenge was run at a face velocity of 16.4 fpm (85 lpm for 170 cm$^2$ test area). The tests were performed loading over 200 mg of DOP. Penetration began at 0.012% and increased to 0.034% after 200 mg of loading.

Tables 1, 2, and 3 show the DOP loading test results for the materials of Example 1, Comparative Example A, and Comparative Example B.

TABLE 1

DOP Penetration (%)

| DOP load (mg) | Example 1 | Comparative Example A | Comparative Example B |
|---|---|---|---|
| 0 | 0.012 | 6.200 | 0.016 |
| 10 | 0.013 | 6.200 | 0.088 |
| 20 | 0.014 | 6.100 | 0.240 |
| 30 | 0.015 | 6.100 | 0.590 |
| 40 | 0.015 | 6.100 | 1.100 |
| 50 | 0.016 | 5.900 | 2.500 |
| 60 | 0.017 | 6.000 | 3.400 |
| 70 | 0.018 | 6.000 | 5.300 |
| 80 | 0.020 | 6.000 | 6.600 |
| 90 | 0.021 | 6.000 | 7.000 |
| 100 | 0.022 | 5.900 | 7.200 |
| 110 | 0.023 | 6.000 | 7.600 |
| 120 | 0.024 | 5.900 | 7.900 |
| 130 | 0.025 | 5.900 | 8.300 |
| 140 | 0.026 | 6.000 | 8.700 |
| 150 | 0.027 | 6.100 | 9.100 |
| 160 | 0.029 | 6.100 | 9.600 |
| 170 | 0.030 | 6.200 | 10.000 |
| 180 | 0.032 | 6.300 | 10.400 |
| 190 | 0.033 | 6.400 | 11.000 |
| 200 | 0.034 | 6.500 | 11.400 |
| 210 | 0.036 | 6.600 | 12.000 |
| 220 | 0.037 | 6.800 | 12.600 |
| 230 | 0.038 | 7.000 | 13.200 |
| 240 | 0.040 | 7.100 | 13.700 |
| 250 | 0.041 | 7.200 | 14.400 |

TABLE 2

Alpha (-100 * log (Pen/100)/Resistance)

| DOP load (mg) | Example 1 | Comparative Example A | Comparative Example B |
|---|---|---|---|
| 0 | 21.35 | 6.60 | 18.56 |
| 10 | 21.06 | 6.46 | 14.83 |
| 20 | 20.78 | 6.40 | 12.58 |
| 30 | 20.56 | 6.32 | 10.69 |
| 40 | 20.41 | 6.24 | 9.29 |
| 50 | 20.16 | 6.20 | 7.62 |
| 60 | 19.92 | 6.11 | 6.90 |
| 70 | 19.68 | 6.03 | 5.99 |
| 80 | 19.46 | 6.00 | 5.54 |
| 90 | 19.25 | 5.92 | 5.39 |
| 100 | 19.15 | 5.86 | 5.31 |
| 110 | 18.95 | 5.77 | 5.20 |
| 120 | 18.76 | 5.77 | 5.07 |
| 130 | 18.58 | 5.69 | 4.99 |
| 140 | 18.40 | 5.62 | 4.87 |
| 150 | 18.24 | 5.52 | 4.74 |
| 160 | 18.16 | 5.49 | 4.63 |
| 170 | 17.92 | 5.38 | 4.52 |
| 180 | 17.76 | 5.31 | 4.44 |
| 190 | 17.61 | 5.25 | 4.31 |
| 200 | 17.48 | 5.19 | 4.22 |
| 210 | 17.42 | 5.10 | 4.11 |
| 220 | 17.19 | 4.98 | 4.00 |
| 230 | 17.08 | 4.88 | 3.90 |
| 240 | x | 4.83 | 3.82 |
| 250 | x | 4.78 | 3.71 |

TABLE 3

Resistance (mm $H_2O$)

| DOP load (mg) | Example 1 | Comparative Example A | Comparative Example B |
|---|---|---|---|
| 0 | 18.2 | 18.3 | 20.5 |
| 10 | 18.3 | 18.7 | 20.6 |
| 20 | 18.4 | 19.0 | 20.8 |
| 30 | 18.6 | 19.2 | 20.9 |
| 40 | 18.6 | 19.5 | 21.0 |
| 50 | 18.7 | 19.8 | 21.1 |
| 60 | 18.8 | 20.0 | 21.3 |
| 70 | 18.8 | 20.3 | 21.3 |
| 80 | 18.9 | 20.4 | 21.4 |
| 90 | 19.0 | 20.6 | 21.5 |
| 100 | 19.0 | 21.0 | 21.5 |
| 110 | 19.1 | 21.2 | 21.6 |
| 120 | 19.2 | 21.3 | 21.7 |
| 130 | 19.3 | 21.6 | 21.7 |
| 140 | 19.4 | 21.8 | 21.8 |
| 150 | 19.4 | 22.0 | 22.0 |
| 160 | 19.4 | 22.1 | 22.0 |
| 170 | 19.5 | 22.4 | 22.1 |
| 180 | 19.6 | 22.6 | 22.2 |
| 190 | 19.7 | 22.8 | 22.3 |
| 200 | 19.7 | 22.9 | 22.4 |
| 210 | 19.7 | 23.1 | 22.4 |
| 220 | 19.9 | 23.5 | 22.5 |
| 230 | 19.9 | 23.7 | 22.5 |
| 240 | 20.0 | 23.8 | 22.6 |
| 250 | x | 23.9 | 22.7 |

EXAMPLE 2

A roll of 19 inch wide composite polypropylene web, comprised of one layer of meltblown at 35 g/m² and one layer of spunbond at 14 g/m², was processed on a cold vapor deposition coater under vacuum. The vacuum chamber was maintained at a pressure of $10^{-4}$ Torr. The nonwoven web was first passed under a plasma unit operating with argon and at 50 watts of power. A fluoroacrylate monomer having $CF_2$—$CF_3$ at a ratio of 16:1 was vaporized and condensed onto the web at a feed rate of 16 ml/min. The web was processed at 150 fpm, depositing approximately 1 g/m₂ of fluoroacrylate on the web. The coated web was then passed through an electron-beam curing station at 10 kV and 20 mAmps. The treated web was then made into an electret by passing the web subjecting the web to a DC corona charge.

EXAMPLE 3

A roll of 48 inch wide composite polypropylene web, comprised of one layer of meltblown at 35 g/m² and one layer of spunbond at 14 g/m², was processed on a cold vapor deposition coater under vacuum. The vacuum chamber was maintained at a pressure of $10^{-4}$ Torr. The nonwoven web was first passed under a plasma unit operating with argon and at 50 watts of power. A fluoroacrylate monomer having $CF_2$—$CF_3$ at a ratio of 16:1 was vaporized and condensed onto the web at a feed rate of 40 ml/min. The web was processed at 150 fpm, depositing approximately 1 g/m² of fluoroacrylate on the web. The coated web was then cured with an ultraviolet light source 10 kV and 20 mAmps. The treated web was then made into an electret by passing the web subjecting the web to a DC corona charge.

Tables 4, 5, and 6 show the DOP loading test results for the materials of Example 2 and Example 3.

TABLE 4

DOP Penetration (%)

| DOP load (mg) | Example 2 - 2 Ply | Example 2 - 4 Ply | Example 3 - 2 Ply | Example 3 - 4 Ply |
|---|---|---|---|---|
| 0 | 0.310 | 0.003 | 0.589 | 0.009 |
| 1 | 0.323 | 0.003 | 0.651 | 0.010 |
| 2 | 0.333 | 0.003 | 0.707 | 0.011 |
| 3 | 0.345 | 0.003 | 0.782 | 0.011 |
| 4 | 0.352 | 0.003 | 0.790 | 0.011 |
| 5 | 0.380 | 0.003 | 0.627 | 0.012 |
| 6 | 0.389 | 0.003 | 0.881 | 0.012 |
| 7 | 0.379 | 0.003 | 0.888 | 0.013 |
| 8 | 0.388 | 0.003 | 0.912 | 0.013 |
| 9 | 0.398 | 0.003 | 0.934 | 0.013 |
| 10 | 0.408 | 0.004 | 0.956 | 0.013 |
| 11 | 0.417 | 0.004 | 0.978 | 0.014 |
| 12 | 0.432 | 0.004 | 0.995 | 0.014 |
| 13 | 0.440 | 0.004 | 1.010 | 0.014 |
| 14 | 0.448 | 0.004 | 1.030 | 0.014 |
| 15 | 0.457 | 0.004 | 1.050 | 0.014 |
| 16 | 0.488 | 0.004 | 1.080 | 0.015 |
| 17 | 0.478 | 0.005 | 1.080 | 0.015 |
| 18 | 0.484 | 0.005 | 1.090 | 0.018 |
| 19 | 0.488 | 0.005 | 1.110 | 0.018 |
| 20 | 0.508 | 0.005 | 1.120 | 0.018 |
| 21 | 0.524 | 0.006 | 1.120 | 0.017 |
| 22 | 0.542 | 0.006 | 1.110 | 0.017 |
| 23 | 0.552 | 0.006 | 1.120 | 0.017 |
| 24 | 0.560 | 0.007 | 1.140 | 0.018 |
| 25 | 0.574 | 0.007 | 1.150 | 0.018 |
| 26 | 0.575 | 0.008 | 1.170 | 0.019 |
| 27 | 0.577 | 0.008 | 1.180 | 0.019 |
| 28 | 0.581 | 0.009 | 1.190 | 0.020 |
| 29 | 0.584 | 0.009 | 1.200 | 0.020 |
| 30 | 0.586 | 0.009 | 1.220 | 0.020 |

TABLE 5

Alpha (−100 * log (Pen/100)/Resistance)

| DOP load (mg) | Example 2 - 2 Ply | Example 2 - 4 Ply | Example 3 - 2 Ply | Example 3 - 4 Ply |
|---|---|---|---|---|
| 0 | 5.6 | 11.7 | 5.4 | 14.1 |
| 1 | 5.6 | 11.7 | 5.4 | 14.1 |
| 2 | 5.8 | 11.7 | 5.4 | 14.2 |
| 3 | 5.7 | 11.8 | 5.4 | 14.2 |
| 4 | 5.7 | 11.7 | 5.5 | 14.3 |
| 5 | 5.7 | 11.9 | 5.5 | 14.4 |
| 6 | 5.7 | 12.0 | 5.6 | 14.5 |
| 7 | 5.7 | 11.9 | 5.6 | 14.5 |
| 8 | 5.8 | 12.1 | 5.7 | 14.6 |
| 9 | 5.8 | 12.0 | 5.7 | 14.6 |
| 10 | 5.8 | 11.9 | 5.8 | 14.7 |
| 11 | 5.9 | 12.0 | 5.8 | 14.7 |
| 12 | 6.0 | 12.2 | 5.8 | 14.7 |
| 13 | 6.0 | 12.1 | 5.8 | 14.8 |
| 14 | 6.0 | 12.2 | 6.9 | 14.9 |
| 15 | 6.0 | 12.3 | 7.0 | 15.0 |
| 16 | 6.1 | 12.2 | 7.0 | 15.0 |
| 17 | 6.1 | 12.3 | 7.0 | 15.1 |
| 18 | 6.1 | 12.4 | 7.0 | 15.1 |
| 19 | 6.2 | 12.3 | 7.1 | 15.2 |
| 20 | 6.3 | 12.4 | 7.1 | 15.2 |
| 21 | 6.2 | 12.4 | 7.1 | 15.3 |
| 22 | 6.2 | 12.4 | 7.1 | 15.3 |
| 23 | 6.3 | 12.4 | 7.2 | 15.4 |
| 24 | 6.3 | 12.6 | 7.2 | 15.4 |
| 25 | 6.3 | 12.7 | 7.3 | 15.5 |
| 26 | 6.3 | 12.8 | 7.3 | 15.5 |
| 27 | 6.4 | 12.8 | 7.3 | 15.6 |
| 28 | 6.4 | 12.7 | 7.3 | 15.6 |
| 29 | 6.4 | 12.7 | 7.4 | 15.6 |
| 30 | 6.5 | 12.7 | 7.4 | 15.7 |

TABLE 6

Resistance (mm $H_2O$)

| DOP load (mg) | Example 2 - 2 Ply | Example 2 - 4 Ply | Example 3 - 2 Ply | Example 3 - 4 Ply |
|---|---|---|---|---|
| 0 | 44.80 | 38.66 | 34.84 | 28.59 |
| 1 | 44.48 | 38.66 | 34.16 | 28.37 |
| 2 | 44.24 | 38.66 | 33.60 | 27.88 |
| 3 | 43.20 | 38.33 | 33.18 | 27.88 |
| 4 | 43.04 | 38.08 | 32.34 | 27.68 |
| 5 | 42.87 | 38.01 | 32.04 | 27.23 |
| 6 | 42.68 | 37.59 | 31.29 | 27.04 |
| 7 | 42.48 | 38.01 | 31.08 | 28.80 |
| 8 | 41.57 | 37.39 | 30.45 | 26.62 |
| 9 | 41.42 | 37.89 | 30.29 | 26.62 |
| 10 | 41.20 | 36.95 | 29.70 | 26.44 |
| 11 | 40.34 | 38.85 | 29.55 | 26.22 |
| 12 | 38.41 | 36.05 | 29.44 | 26.22 |
| 13 | 39.28 | 36.35 | 29.35 | 25.88 |
| 14 | 39.15 | 36.05 | 28.80 | 25.55 |
| 15 | 39.00 | 36.76 | 28.27 | 25.59 |
| 16 | 38.19 | 38.05 | 28.21 | 25.49 |
| 17 | 38.04 | 34.97 | 28.09 | 25.32 |
| 18 | 37.95 | 34.89 | 28.04 | 25.14 |
| 19 | 37.17 | 34.97 | 27.53 | 24.97 |
| 20 | 38.41 | 34.69 | 27.40 | 24.97 |
| 21 | 38.78 | 34.05 | 27.48 | 24.84 |
| 22 | 36.55 | 34.05 | 27.53 | 24.64 |
| 23 | 35.84 | 34.05 | 27.09 | 24.45 |
| 24 | 35.74 | 32.98 | 26.99 | 24.32 |
| 25 | 35.57 | 32.72 | 26.57 | 24.18 |
| 26 | 35.58 | 32.52 | 26.46 | 24.01 |
| 27 | 34.98 | 32.52 | 26.41 | 23.85 |
| 28 | 35.17 | 31.55 | 26.36 | 23.71 |
| 29 | 34.90 | 31.85 | 25.98 | 23.71 |
| 30 | 34.34 | 31.88 | 25.88 | 23.56 |

The features and other details of the invention will now be more particularly described and pointed out in the claims. It will be understood that the particular embodiments of the invention are shown by way of illustration and not as limitations of the invention. The principle features of this invention can be employed in various embodiments without departing from the scope of the invention. All references cited herein including those in the background section are expressly incorporated herein by reference in their entirety.

What is claimed is:

1. An electret filter media comprising fibrous web having a substantially continuous uniform thickness polymer coating that is a vapor deposition formed condensed liquid monomer polymerized onto fibers that form the fibrous web.

2. The electret filter media of claim 1, wherein the polymer coating is formed of an oleophobic and/or hydrophobic monomer selected from the group consisting of an alkylene, an acrylate, and a methacrylate, followed by the curing of the monomer.

3. The electret filter media of claim 2, wherein the monomer is halogenated.

4. The electret filter media of claim 3, wherein the monomer is a fluorine-containing monomer.

5. The electret filter media of claim 3, wherein the monomer is hexafluoropropylene.

6. The electret filter media of claim 1, wherein said filter media has a filter efficiency and degradation value of at least P 95.

7. The electret filter media of claim 1, wherein the polymer coating is a fluoropolymer.

8. The electret filter media of claim 7, wherein the fluoropolymer is selected from the group consisting of polytetrafluoroethylene and fluorinated ethylenepropylene.

9. The electret filter media of claim 1, wherein the fibrous web is a meltblown polymer fiber web that is formed from polymers selected from the group consisting of polyolefins, acrylics, vinyl halides, polyvinyl ethers, polyvinyl halides, polyacrylonitrile, polyvinyl ketones, polyvinyl esters, polyamides, polyesters, polycarbonates, polyimides, polyethers, and fluoropolymers.

10. The electret filter media of claim 9, wherein said fibrous web includes polymer fibers having a diameter in the range of between about 0.5 to 20 µm.

11. The electret filter media of claim 1, wherein the weight of said fibrous web is in the range of between about 10 to about 520 g/m².

12. The electret filter media of claim 1, wherein a charge stabilizing additive is incorporated into the fibrous web as a meltblown additive.

13. The electret filter media of claim 12, wherein the charge stabilizing additive is a fatty acid amide.

14. The electret filter media of claim 13, wherein the fatty acid amide is selected from the group consisting of stearamide, ethylene bis-stearamide, and ethylene bis-palmitamide.

15. The electret filter media of claim 12, wherein the charge stabilizing additive is present in the fibrous web at a concentration in a range from about 0.01% to 20% by weight.

16. The electret filter media of claim 1, wherein the fibrous web is selected from the group consisting of a meltblown web, a carded web, a spunbond web, and a spun laced web.

17. The electret filter media of claim 1, wherein the fibrous web is formed from fibers selected from the group consisting of polymer fibers and glass fibers.

18. An electret filter media comprising a fibrous web having a substantially uniform vapor deposition formed polymer coating thereon, the coating having a thickness in the range of about 50 Angstroms to 1 micron.

19. An electret filter media comprising a fibrous web having a substantially uniform polymer coating that is a vapor deposition formed condensed liquid monomer polymerized onto fibers that form the fibrous web, and having a melt processable charge stabilizing additive within said web, wherein said additive is present at a concentration in a range from about 0.01% to 20% by weight.

20. The electret filter media of claim 19, wherein the polymer coating has a thickness in the range of about 50 Angstroms to 1 micron.

21. The electret filter media of claim 19, wherein the polymer coating is formed from the polymerization of a monomer selected from the group consisting of an alkylene, an acrylate, and a methacrylate.

22. The electret filter media of claim 21, wherein the monomer is halogenated.

23. The electret filter media of claim 22, wherein the monomer is a fluorine-containing monomer.

24. The electret filter media of claim 23, wherein the monomer is hexafluoropropylene.

25. The electret filter media of claim 19, wherein said filter media has a filter efficiency and degradation value of at least P 95.

26. The electret filter media of claim 19, wherein said fibrous web includes polymer fibers having a diameter in the range of between about 0.5 to 20 µm.

27. The electret filter media of claim 19, wherein the weight of said fibrous web is in the range of between about 10 to about 520 g/m².

28. A respirator having a filter element comprising a fibrous web having a substantially continuous thickness uniform polymer coating that is a vapor deposition formed condensed liquid monomer polymerized by onto fibers that form the fibrous web.

29. The respirator of claim 28, wherein the polymer coating is formed of an oleophobic and/or hydrophobic monomer selected from the group consisting of an alkylene, an acrylate, and a methacrylate, followed by the curing of the monomer.

30. The respirator of claim 29, wherein the monomer is halogenated.

31. The respirator of claim 30, wherein the monomer is a fluorine-containing monomer.

32. The respirator of claim 31, wherein the monomer is hexafluoropropylene.

33. The respirator of claim 28, wherein the polymer coating is a fluoropolymer.

34. The respirator of claim 33, wherein the fluoropolymer is selected from the group consisting of polytetrafluoroethylene and fluorinated ethylenepropylene.

35. The respirator of claim 28, wherein the fibrous web is a meltblown polymer fiber web formed from polymers selected from the group consisting of polyolefins, acrylics, vinyl halides, polyvinyl ethers, polyvinyl halides, polyacrylonitrile, polyvinyl ketones, polyvinyl esters, polyamides, polyesters, polycarbonates, polyimides, polyethers, and fluoropolymers.

36. The respirator of claim 28, wherein a charge stabilizing additive is incorporated into the fiber web as a meltblown additive.

37. The respirator of claim 36, wherein the charge stabilizing additive is a fatty acid amide.

38. The respirator of claim 37, wherein the fatty acid amide is selected from the group consisting of stearamide, ethylene bis-stearamide, and ethylene bis-palmitamide.

39. The respirator of claim 36, wherein the charge stabilizing additive is present in the fibrous web at a concentration in a range from about 0.01% to 20% by weight.

40. A method for manufacturing an electret filter media comprising the steps of:
providing a fibrous web;
vaporizing an oleophobic and/or hydrophobic monomer;
condensing the vaporized monomer onto to form a monomer coating on the fibers that form the fibrous web;
exposing the monomer coating to sufficient energy to cause the monomer to polymerize, forming a polymer coated fibrous web; and
treating the polymer coated fibrous web to form substantially permanent charge pairs or dipoles in the fibrous web.

41. The method of claim 40, wherein the monomer is selected from the group consisting of an alkylene, an acrylate, and a methacrylate.

42. The method of claim 41, wherein the fibrous web is a meltblown fiber web.

43. The method of claim 42, wherein the monomer is halogenated.

44. The method of claim 43, wherein the monomer is a fluorine-containing monomer.

45. The method of claim 44, wherein the monomer is hexafluoropropylene.

46. The method of claim 40, further comprising the step of annealing the fibrous web at an elevated temperature prior to the step of condensing the vaporized monomer.

47. The method of claim 46, wherein the temperature is between about 65° C. and 230° C.

48. The method of claim 46, wherein the fibrous web is annealed for about 15 second to 5 minutes.

49. The method of claim 40, further comprising the step of preparing the surface of the fibrous web prior to the step of vaporizing an oleophobic and/or hydrophobic monomer.

50. The method of claim 49, wherein the step of preparing the surface of the fibrous web comprises applying a treatment selected from the group consisting of a plasma treatment, a heat treatment, and a flame treatment.

51. The method of claim 40, wherein the step of exposing the monomer coating to sufficient energy comprises applying an energy source selected from the group consisting of infrared, electron beam, thermionic, plasma, gamma, and ultraviolet radiation.

52. The method of claim 51, wherein the energy source has a wavelength of about 160 nm to 450 nm.

53. The method of claim 40, wherein a charge stabilizing additive is incorporated into the fibrous web as a meltblown additive.

54. The method of claim 53, wherein the charge stabilizing additive is a fatty acid amide.

55. The method of claim 54, wherein the fatty acid amide is selected from the group consisting of stearamide, ethylene bis-stearamide, and ethylene bis-palmitamide.

56. The method of claim 55, wherein the charge stabilizing additive is present in the fibrous web at a concentration in a range from about 0.01% to 20% by weight.

57. An electret filter media, comprising a fibrous web having a substantially uniform vapor deposition formed polymer coating thereon, the fibrous web having an alpha value of at least about 20.

58. The electret filter media of claim 57, wherein the polymer coating has a thickness in the range of about 50 Angstroms to 1 micron.

59. The electret filter media of claim 57, wherein the polymer coating has a thickness in the range of about 100 Angstroms to 1500 Angstroms.

60. The electret filter media of claim 57, wherein the polymer coating is a monolithic coating.

61. An electret filter media, comprising a fibrous web having a substantially uniform vapor deposition formed polymer coating thereon, the filter media has an alpha value above about 10 after a DOP test challenge loading over 200 mg of DOP at a face velocity of 16.4 fpm (85 lpm for 170 $cm^2$ test area).

62. The electret filter media of claim 61, wherein the filter media has an alpha value above about 15 after a DOP test challenge loading over 200 mg of DOP at a face velocity of 16.4 fpm (85 lpm for 170 $cm^2$ test area).

* * * * *

UNITED STATES PATENT AND TRADEMARK OFFICE
CERTIFICATE OF CORRECTION

PATENT NO.    : 6,802,315 B2
DATED         : October 12, 2004
INVENTOR(S)   : Gahan et al.

It is certified that error appears in the above-identified patent and that said Letters Patent is hereby corrected as shown below:

Title page,
Item [73], Assignee, should be -- Hollingsworth & Vose Company --.

Signed and Sealed this

Fifth Day of July, 2005

JON W. DUDAS
*Director of the United States Patent and Trademark Office*